Patented Apr. 6, 1948

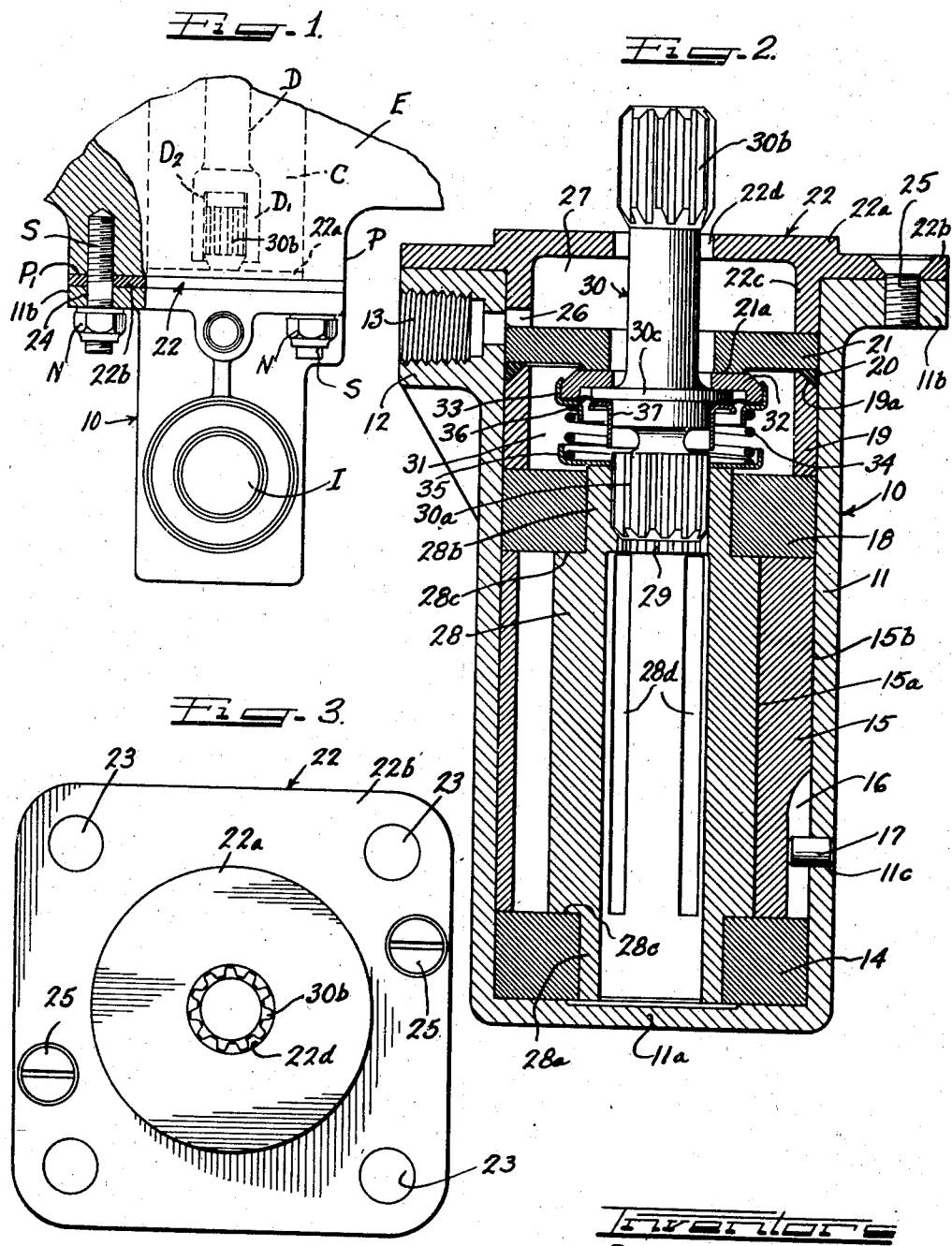

2,439,241

UNITED STATES PATENT OFFICE 2,439,241

PUMP ASSEMBLY

Russell R. Curtis and Richard L. Gates, Dayton, Ohio, assignors to Curtis Pump Company, Dayton, Ohio, a corporation of Ohio Application February 6, 1943, Serial No. 474,969

4 Claims. (Cl. 103—136)

This invention relates to pump constructions and particularly to the arrangement of pumping and sealing means in a casing so that a cover for the casing will hold the means in operative assembly, which cover, in turn, can be clamped between a flange on the casing and a mounting block for the pump such as an engine pad.

A feature of this invention is the utilization of lightweight plastic parts in pump constructions, and the arrangement of these parts so that they will adequately carry the loads to which they may be subjected during use of the pump.

While the invention will be hereinafter specifically described as embodied in a vane-type pump adapted for mounting on an engine, such as an airplane engine, to pump fuel to the engine, it should, of course, be understood that the invention is not limited to such an embodiment since it includes within its scope all types of pumps, blowers and the like having the constructions defined by the appended claims.

It is an object of this invention to provide an inexpensive, readily assembled, lightweight pump.

A further object of this invention is to provide a construction including parts mounted in a casing and held in operative assembled relation in the casing by a cover which cover, in turn, is adapted to be clamped between the casing and a mounting part for the casing.

A further object of the invention is to provide pumps adapted for direct mounting on an airplane engine to supply fuel to the engine which pumps include a metal casing and a thermosetting synthetic plastic cover for said casing adapted to be clamped between the casing and engine.

A still further object of the invention is to provide airplane engine fuel pumps with thermosetting synthetic plastic covers which hold the pump parts in assembled operative relation in a housing.

A further object of the invention is to provide a rotary vane-type pump wherein the pump housing forms a thrust face for one of the pump rotor bearings, the pump liner thrusts against this bearing, a second bearing is held in proper spaced relation from the first mentioned bearing by the liner, a spacer sleeve thrusts against this second bearing to provide a chamber for pump seal parts in the casing, a stationary seal ring thrusts against the spacer sleeve, and a skirt on an end cap for the open end of the casing holds all of the aforementioned elements in such thrusting relationship.

Other and further objects of the invention will be apparent to those skilled in the art from the following detailed description of the annexed sheet of drawings, which, by way of preferred example only, illustrates one embodiment of the invention.

On the drawings:

Figure 1 is a fragmentary elevational view, with parts broken away and shown in vertical cross section, of a pump according to this invention mounted on an engine.

Figure 2 is a longitudinal cross-sectional view of the pump shown in Figure 1.

Figure 3 is an end elevational view illustrating the cover for the pump shown in Figures 1 and 2.

As shown on the drawings:

As shown in Figure 1, the pump 10 of this invention is mounted on an engine E, such as an airplane engine having a pad P providing a flat mounting face $P_1$ around a chamber C in the engine in which is mounted a driver D such as one of the driven shafts of the engine E. The driver D has a socket end $D_1$ which is preferably internally splined as at $D_2$ to receive the splined end of the pump drive shaft as will be more fully hereinafter described.

Studs S are tapped into the pad P of the engine E and project from the flat face $P_1$ thereof. Four such studs S are preferably disposed symmetrically about the opening of the engine chamber C.

As best shown in Figure 2, the pump 10 is composed of a casing or housing 11. The casing or housing 11 can be formed of metal and defines a cylindrical chamber with a closed end provided by the end wall 11a of the casing. The cylindrical chamber defined by the casing also has an open end bounded by an outturned flange 11b. Bosses 12 are formed at intervals around this flange 11b and these bosses are tapped radially as at 13 to provide drain outlets communicating with the interior of the casing as will be more fully hereinafter described.

The closed end 11a of the casing provides a thrust face which receives a first bearing ring 14. This bearing ring can be composed of graphitic carbon.

A liner 15, preferably of metal, is next mounted in the casing 11 to define, with its inner surface 15a thereof, the pump bore. The liner 15, of course, has a cylindrical outer surface 15b snugly fitting the cylindrical inner wall of the casing.

In order to prevent rotation of the liner 15 in the casing, the liner preferably has a slot 16 cut in the outer face thereof to receive a pin 17 pressed through a hole 11c in a side wall of the casing. The liner 15 is thus held against rotation and in proper relationship to the fluid inlet and outlet for the pump. An inlet I of the pump is shown in Figure 1.

A second bearing ring 18, which can also be composed of graphitic carbon, is seated in the casing 11 against the other end of the liner 15.

A spacer sleeve 19 is mounted in the casing 11 against the second bearing ring 18. This spacer sleeve can be composed of metal or lightweight plastic.

The sleeve 19 preferably has a beveled end 19a cooperating with the inner wall of the housing 11 to provide a recess for a packing ring or gasket 20 of resilient material.

A stationary seal ring 21 is next mounted in the casing 11 and is seated on the gasket 20. This stationary seal ring can be composed of graphitic carbon or can be of composite structure having an active sealing face 21a composed of graphitic carbon.

In accordance with this invention, the open end of the casing 10 is closed with a cover 22 adapted to hold all of the parts 14, 15, 18, 19, 20 and 21 in operative thrusting relation. This cover 22, because of the manner in which it is clamped when mounted on the engine E as shown in Figure 1, can be composed of lightweight plastic such as a hard, thermoset synthetic resin having heat-resisting properties.

The cover 22 has a raised pilot portion 22a surrounded by a marginal portion 22b adapted to overlie the flange 11b of the casing. This marginal portion 22b, as shown in Figure 3, is of substantially square shape with rounded corners and has apertures 23 adjacent the rounded corners adapted to receive the studs S on the engine as will be hereinafter described. The cover 22 is secured on the flange 11b with the apertures 23 aligned with similar apertures 24 (Figure 1) in the flange 11b of the casing by means of two flat head screws 25. These screws are threaded into the casing flange 11b as shown in Figures 2 and 3 and having their flat heads flush with or countersunk in the marginal portion 22b of the cover.

The screws 25 need not be of very strong construction since they are only intended to hold the cover in assembled relation on the casing 11. As will hereinafter be described, they do not carry thrust loads when the pump is operatively mounted on the engine pad P.

The cover 22 has a cylindrical depending skirt portion 22c fitting in the open end of the casing 11 as best shown in Figure 2. This skirt portion 22c thrusts against the stationary seal ring 21 but can be recessed at intervals around the free end thereof as at 26 so that ports will be provided joining the space 27 in the casing between the cover and seal ring 21 with one of the drain ports 13.

A rotor 28 has reduced diameter cylindrical ends 28a and 28b respectively seated in the first and second bearing rings 14 and 18. This rotor 28 thus has shoulders 28c adapted to be thrust against the inner faces of the bearing rings.

The rotor is slotted as at 28d between the shoulders 28c to carry the usual sliding pumping vanes for cooperating with the inner wall 15a of the liner 15.

It will be understood, of course, that fluid is fed through a port (not shown) in the liner 15 from the inlet I and is discharged by the vanes through another port (not shown) in the liner out of an outlet in the pump casing (not shown).

It should also be understood that a by-pass and relief valve arrangement can be mounted on the pump casing 11 in a manner similar to that shown in the Russell R. Curtis Patent 2,268,805, dated January 6, 1942.

The end portion 28b of the rotor 28 is internally splined as at 29 to receive the splined end 30a of a pump drive shaft 30. This pump drive shaft 30 extends through a chamber 31 in the casing provided between the second bearing ring 18 and the stationary seal ring 21 by the spacer sleeve 19, thence through an aperture in the stationary seal ring 21, through the chamber 27, and through an opening 22d in the cover to terminate in another splined end 30b outside of the pump. This splined end 30b is adapted to be seated in the splined socket $D_1$ of the engine driver D as shown in Figure 1.

The pump shaft 30 has an integral collar or radial flange 30c thereon in the chamber 31. A rotating seal ring 32, which is preferably composed of metal such as Nitralloy, is disposed between the collar 30c and the sealing face 21a of the stationary seal ring 21. This rotating seal ring 32 has a metal cover 33 crimped therearound which is urged by a spring 34 held under compression between a retainer 35 bottomed on the rotor portion 28b and the cover 33 to urge the ring 32 against the ring 21.

The splines 29 and 30a are preferably of involute construction so that the pump shaft 30 can rock in the rotor in the event of misalignment between the rotor and driver D of the engine.

The seal arrangement is claimed in our United States Patent 2,380,222, granted July 10, 1945, and is such that the shaft 30 can be rocked or axially moved without unseating the seal ring and without permitting leakage between the collar 30c and ring 32. To prevent such leakage a flexible diaphragm 36 has an outer marginal portion thereof clamped by the cover 33 tightly against the rotating seal ring 32 together with inner marginal portion clamped by a sleeve 37 pressed on the pump shaft 30 against the collar 30c. With this arrangement, and with the pressure of the spring 34 being directed on the outer marginal portion of the rotating seal ring 32, the collar 30c of the pump shaft could be cocked off of the rotating seal ring 32 without permitting leakage from the chamber 31 into the chamber 27 because the diaphragm 36 will, of course, prevent this leakage. Therefore, the pump shaft 30 could move axially, wobble or rock without causing leakage and without effecting unseating of the rotating seal ring off of the stationary seal ring.

In the event, however, that any leakage did occur into the chamber 27, the leaked-in fluid could be drained through the port 26 in the cover into a drain line adapted to be tapped into the port 13.

As shown in Figure 1, the pilot portion 22a of the cover 22 is adapted to be seated in the chamber C of the engine E with the marginal portion 22b of the cover seated on the flat face $P_1$ of the pad and receiving the studs S through the aperture 23 thereof. The studs also project through the apertures such as 24 of the casing flange 11b and receive nuts N. The nuts N draw the casing flange 11b toward the pad P and thus clamp the cover between the flat face $P_1$ of the pad and the casing flange 11b. The flat heads of the screws 25 will, of course, not interfere with a full seating of the marginal portion 22b of the cover on the pad face $P_1$. In operation, therefore, the cover 22 is clamped between the mounting means and the casing flange and effectively supported thereby so as to carry all thrust loads imparted to it by the pumping and sealing means in the casing. With this arrangement the cover can be made of lightweight plastic material.

The skirt 22c of the cover takes all of the axial thrust loads of the parts 14, 15, 18, 19 and 21 and holds the packing 20 in a compressed state.

The pumps of this invention are readily assembled by sliding the first bearing ring 14 into the casing against the end wall 11a thereof. The rotor can then be seated to position its end 28a into the bearing ring 14. The liner 15 can be slid into the casing around the rotor and the second bearing ring 18 then slipped in the casing around the part 28b of the rotor. Obviously, of course, an assembly including the bearing rings, the rotor and vanes and the liner could be slipped into the casing as a unit. The pump shaft 30 is merely slid in position in the member 28b of the rotor and can have the rotating seal construction already mounted thereon. The spacer sleeve 19 is merely slid into the casing followed by the packing ring and the stationary seal ring.

The pumps of this invention are lightweight, compact, very inexpensive, and easily assembled.

It will, of course, be understood that various details of construction may be varied through a wide range without departing from the principles of this invention and it is, therefore not the purpose to limit the patent granted hereon otherwise than necessitated by the scope of the appended claims.

We claim as our invention:

1. In a pump and engine assembly including an engine having an apertured mounting pad, studs projecting from the pad around the aperture, and nuts threaded on the studs, the improvements of a pump casing having a closed end and an open end with an outturned flange therearound, a first bearing ring in the casing at the closed end thereof, a pump liner in the casing having one end against said first bearing ring, a second bearing ring in the casing against the other end of the liner, a spacer sleeve slidably fitting on the interior wall of the casing having one end against the second bearing ring, a resilient gasket in the casing at the other end of the sleeve, a stationary seal ring in the casing seated against the gasket, a cover for the open end of the casing having a peripheral portion overlying the casing flange, a skirt portion extending into the casing to thrust against the stationary seal ring thereby imparting the sole thrusting force for holding said bearing rings, pump liner, spacer sleeve, and seal ring together, and an external pilot portion seating in the aperture of the engine pad, a rotor having reduced diameter end portions in said first and second bearing rings, a shaft splined in that portion of the rotor which is seated in the second bearing ring, a rotatable seal on the shaft, means urging the rotatable seal against the stationary seal ring, said peripheral portion of the cover and said casing flange having apertures receiving said studs therethrough and said nuts threaded on said studs thrusting against the casing flange clamping the cover between the pad and flange whereby the thus clamped cover will cooperate with the closed end of the casing to carry all thrust of parts in the casing.

2. In a pump construction including a casing defining a chamber having an end thrust face and an open end opposite said thrust face with an outturned flange therearound, spaced bearings in said casing, pumping means in said casing rotatably supported by said bearings, a drive shaft extending into said casing through the open end thereof and having an inner end rockably connected to said pumping means, a stationary seal ring means slidably fitting on the interior wall of the casing and surrounding the drive shaft in spaced relation therefrom, and a rotating seal ring sealingly connected to said drive shaft and having a face portion in sliding sealing engagement with the stationary seal ring means, the improvement of a spacer sleeve in said casing between said stationary seal ring means and one of said bearings and in contact therewith, and a cover for said open end of the casing having a flange portion overlying the outturned flange of the casing and a skirt portion slidably fitting on the interior wall of the casing and having an end face contacting said stationary seal ring means to cooperate in opposed relation to the end thrust face of the casing for carrying all thrust loads on the pumping means and stationary seal ring means.

3. A pump construction comprising a casing having an open end and a closed end, pumping means in said casing bottomed on the closed end thereof and terminating inwardly from the open end thereof, a drive shaft in said casing projecting through the open end thereof and rockably splined to said pumping means for driving the pumping means, a spacer sleeve slidably mounted in said casing in spaced relation around said drive shaft and bottomed on said pumping means, stationary seal ring means bottomed on said spacer sleeve, said stationary seal ring means slidably fitting the interior of said casing and surrounding the drive shaft in spaced relation therefrom, rotating seal ring means sealingly connected to said drive shaft and having a face in sliding sealing contact with the stationary seal ring means, and an apertured cover closing the open end of said casing and receiving the drive shaft freely therethrough, said cover having an end faced portion thrusting against said stationary seal ring means to coact with said spacer sleeve and said pump means in the casing for clamping the stationary seal ring means in position in the casing and for coacting with the closed end of the casing to carry all thrust loads of the parts in the casing.

4. A pump comprising a casing, spaced bearings in said casing, pumping means in said casing rotatably supported by said bearings, a drive shaft rockably splined to said pumping means and having a projecting portion, a rotatable sealing ring supported by said projecting portion, a flexible diaphragm extending from said projecting portion to said sealing ring, stationary sealing ring means in sliding sealing engagement with said rotatable sealing ring and slidably fitting on the interior wall of said casing, a spacer ring bottomed on one of said bearings and disposed in said casing between said bearing and said stationary sealing ring means, and a cover removably secured to said casing and having a depending skirt portion extending into the casing in thrusting relation to said stationary sealing ring means to secure said stationary sealing ring means in the casing.

RUSSELL R. CURTIS.
RICHARD L. GATES.

REFERENCES CITED

The following references are of record in the file of this patent:

UNITED STATES PATENTS

| Number | Name | Date |
| --- | --- | --- |
| 2,192,588 | Heckert | Mar. 5, 1940 |
| 2,192,660 | Johnson | Mar. 5, 1940 |
| 2,260,809 | Johnson | Oct. 28, 1941 |
| 2,268,804 | Curtis | Jan. 6, 1942 |
| 2,294,387 | Curtis et al. | Sept. 1, 1942 |
| 2,351,817 | Johnson | June 20, 1944 |
| 2,353,545 | Caserta | July 11, 1944 |